United States Patent Office 2,915,681
Patented Dec. 1, 1959

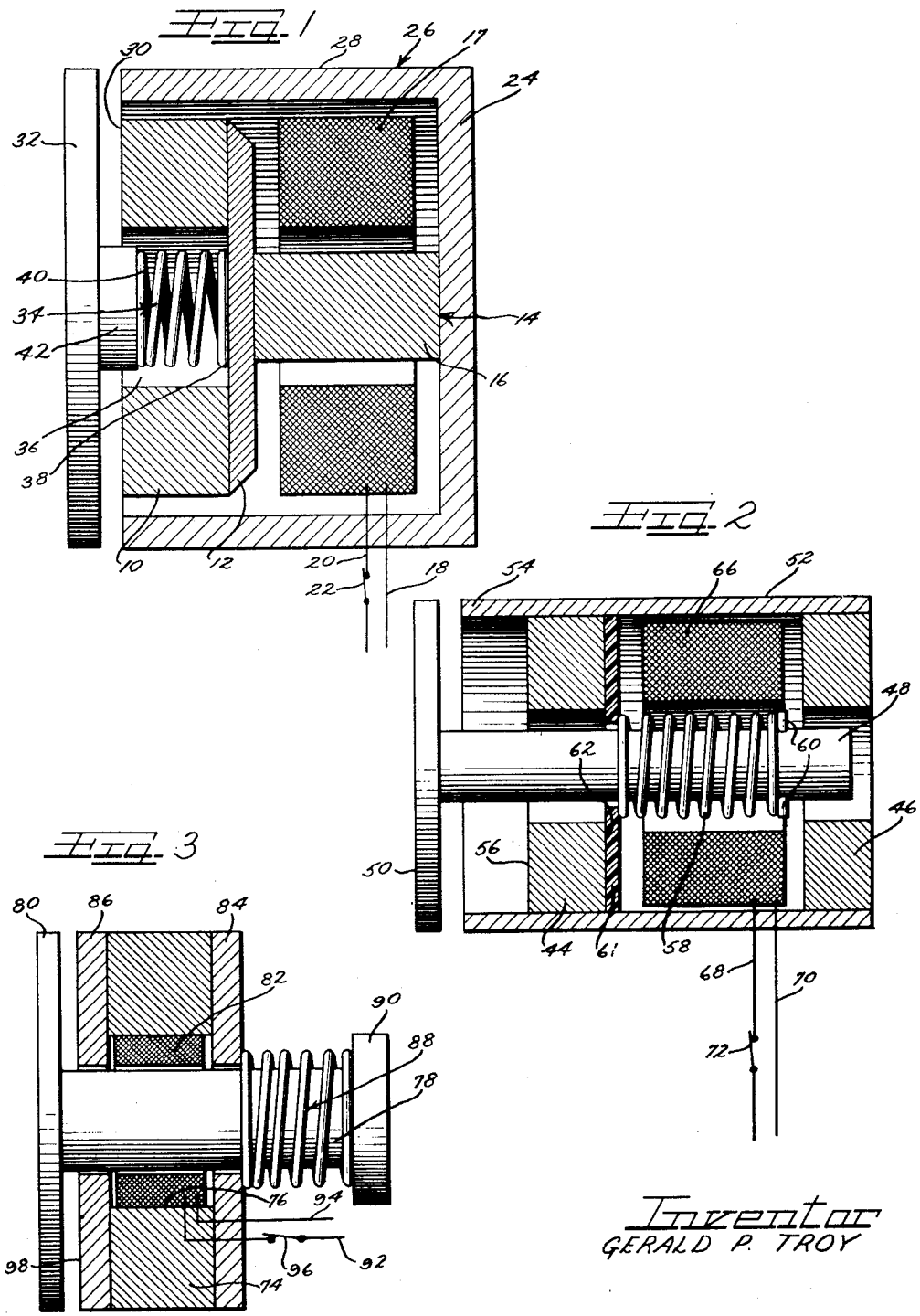

2,915,681

MAGNET ASSEMBLIES

Gerald P. Troy, Rochester, N.Y., assignor to The Indiana Steel Products Company, Valparaiso, Ind., a corporation of Indiana Application November 20, 1957, Serial No. 697,701

13 Claims. (Cl. 317—123)

The present invention relates to an improved magnet assembly, and more specifically to an improved method and apparatus for controllably attracting or releasing magnetically attracted material.

It is an object of the present invention to provide a holding assembly employing a permanent magnet having a strong field with a coil of wire in the magnetic circuit which is energized with a D.C. current to create a strong adverse field to the point where the permanent magnet does not put out flux to release a member held by the permanent magnet.

Another object of the invention is to provide an improved holding assembly which is readily and easily controlled, and which does not require the use of an electrical current, except when the held object is to be released.

Another object of the invention is to provide a holding assembly utilizing a strong permanent magnet of the non-oriented ceramic type, such as a barium oxide iron oxide type, and controlling the field of the magnet to release a held member by generating a strong adverse field to cancel the flux and again holding the member by removing the strong adverse field whereby the permanent magnet again recovers full strength.

A further object of the invention is to provide improved forms of holding assemblies utilizing a permanent magnet with a coil to selectively generate an adverse flux, and wherein the held object is a keeper which may be continually urged away from the permanent magnet to be positively released when the flux of the permanent magnet is canceled.

Other objects and advantages will become more apparent with the teaching of the principles of the invention in connection with the disclosure of the preferred forms thereof, in the specification, claims, and drawings, in which:

Figure 1 is a sectional view taken through the axial center of a magnet assembly embodying the principles of the present invention;

Figure 2 is a sectional view taken through the axial center of a magnet assembly, also embodying the principles of the present invention; and, Figure 3 is another form of magnet assembly utilizing the principles of the invention.

In accordance with the principles of the invention, a controllable magnet assembly is provided utilizing a permanent magnet putting out a strong field. Although not limited to one magnetic material, certain advantages have been found to exist in utilizing a non-oriented ceramic magnet of the barium oxide iron oxide type. This material when used in forms in accordance with the invention, obtains advantages and objectives not fully present with other materials.

The permanent magnet will have located in its magnetic circuit, a coil of wire of an appropriate number of turns. A direct current is caused to flow through this coil in such a direction that a field is generated which opposes the permanent magnet field to substantially cancel the original field, or reduce it to where the magnet drops whatever it is holding. When the direct current is turned off, the permanent magnet assembly recovers its full strength, or practically full strength, and is ready to pick up objects again.

In one preferred form, the magnet assembly forms a holding mechanism which holds or releases a keeper. A spring is employed which continually urges the keeper in a direction away from the magnetic field, with the spring having less strength than the field. When the permanent magnet is at full strength, the keeper will be held to the assembly. When a direct current is flowing through the coil in a direction to generate an adverse field to the field of the permanent magnet assembly, the spring will move the keeper to a position away from the permanent magnet assembly. Upon termination of the flow of electrical current through the coil, the permanent magnet will regain full strength and again attract the keeper and move it to attracted position against the magnet assembly.

Preferred forms, each of which obtain certain advantages and which employ the principles of the invention, are shown in the drawings in Figures 1, 2 and 3.

In Figure 1, an annular magnet ring 10 is employed formed of a non-oriented ceramic magnet material of the barium oxide iron oxide type, such as that known as Indox I. This material is known to the art and its magnetic characteristics will be recognized by those skilled in the art, Indox V can be used in some circumstances, such as where design requirements do not require the magnet to be knocked down below the knee of the curve.

The magnet ring is attached, such as by cementing to a circular end flange 12 of a spool 14. The spool 14 has a core 16 around which is wound or positioned an electric coil 17 of the proper number of turns so that when a direct current is impressed thereon, an adverse field will be generated in a direction to buck the field of the permanent magnet ring to a degree where the magnet does not put out effective flux. Electricity is supplied to the coil through leads 18 and 20, and the flow of electricity may be controlled, such as by a switch 22.

The opposing flange 24 of the spool 14 forms the base of a circular cup 26. The sides of the cup are formed by an annular wall 28 which extends around the outside of the coil 17 and surrounds the magnetic ring 10 projecting axially to the outer surface 30 of the ring 10.

The magnetic assembly is shown as controllably attracting and releasing a keeper plate 32. The keeper plate is formed of a magnetically attracted material, such as steel. The parts of the spool 16 and the cup 26 are also formed preferably of a material which will conduct magnetic flux.

The keeper plate is continually urged away from the face 30 of the magnet ring 10 by a coil compression spring 34, which is located in a space 36 within the magnetic ring 10. The base 38 of the spring is fastened to the flange 12 and the outer end 40 of the spring is fastened to a boss 42 on the inside of the keeper plate, thus supporting the plate in its movement.

Thus, it will be seen in operation of the magnet assembly in Figure 1, when the switch 22 is closed, a current will flow through the coil 17, and a field will be created which is adverse to the field of the permanent magnet ring 10. During this period, the permanent magnet will put out substantially no effective flux, with respect to the keeper plate 32, and the plate will be moved away from the magnet ring 10 in a positive manner by the compression spring 34.

When the circuit is broken by opening the switch 22, the permanent magnet 10 will regain its full strength, and the keeper plate will again be immediately attracted to the magnet ring 10. Thus, during the normal holding period of the keeper plate, no flow of electrical current is required, and the plate is firmly and positively held by the permanent magnet ring 10.

In the form illustrated in Figure 2, a pair of spaced magnet rings 44 and 46 are illustrated. These are annularly shaped permanent rings preferably formed from non-oriented ceramic magnet material, such of the barium oxide iron oxide type, and may be of the type known to the art as Indox I. In this instance, the magnets are magnetized radially.

Axially located with respect to the magnets, is the keeper plunger 48 having a circular keeper head 50 attached or integral therewith.

The magnetic rings 44 and 46 are held in their spaced position within a sleeve 52 which preferably is formed of steel. An end 54 projects out beyond the base 56 of the magnetic ring 10, and the keeper plate 32 will engage the end of the sleeve 42 when attracted by the magnetic rings 44 and 46.

The keeper assembly, including the plunger 48 and plate 40, are continually urged to the release position by a coil tension spring 58. The coil tension spring 58 is secured at one end to pins 60 projecting radially from the keeper plunger 48, and at the other end to a circular non-magnetic plate 61. The non-magnetic plate is fixed in position against a face 62 of the magnetic ring 44, and within the field sleeve 52.

In normal attracted position, the keeper will be held against the end of the steel sleeve. To move the keeper end to the position shown in Figure 2, an adverse field is created by a coil 66, which is located in the space between the magnetic rings 44 and 46, and which is annular in shape. The coil is wound in a direction and has a size to create a field to act adversely to the fields of the magnetic rings 44 and 46 to a point where they do not put out effective flux. For this purpose, direct current is fed to the coils through leads 68 and 70, and the flow of current is controlled by a switch 72. When the switch is again opened, the magnetic rings 44 and 46 regain their full strength, and the keeper will be again attracted and moved against the end of the sleeve.

In the assembly shown in Figure 3, an annular magnetic ring 74 is used, which is preferably a non-oriented ceramic magnet of the barium oxide iron oxide type, such as Indox I. Within the magnetic ring, and having a diameter to leave a space between it and the inner circular surface 76 of the ring, is a keeper plunger 78, which is coaxially located with respect to the ring. At one end, the keeper plunger carries a keeper plate 80.

In the space between the keeper plunger 78 and the permanent magnet 74 is located an electrical coil 82.

On each side of the magnetic ring 74 is an annular steel plate 84 and 86. The plate 84 has a center opening which is of a size to provide a sliding fit for supporting the steel plunger 78 in its axial movement.

The keeper plunger 78 is normally urged to release position, which is the position shown in Figure 3, by a coil tension spring 88. The spring is attached at one end to the steel plate 84, and at the other end to the enlarged end 90 of the keeper plunger.

To energize the electrical coil 82, electrical leads 92 and 94 connect thereto. The flow of electricity is controlled by a switch 96. When the switch is closed, the coil is energized and creates an adverse field, which prevents the magnet ring 74 from putting out an effective flux. The spring will thus urge the keeper plate 80 to the position shown in Figure 3. When the circuit is broken by opening the switch 96, the permanent magnet will again regain full strength and attract the keeper plate and draw it against a face 98 of the steel ring 86.

Again, is with Figure 1, Index V can be used instead of Indox I, if design requirements do not require that the magnet be knocked down below the knee of the curve.

Thus, it will be seen that I have provided an improved magnet assembly and method which meets the objectives and advantages hereinbefore set forth. The invention provides a holding assembly which utilizes a permanent magnet that exerts a holding force without the expenditure of electrical energy.

The invention has many practical applications for various types of equipment. While barium oxide iron oxide type of magnets are utilized in the preferred form, the application of the invention is not limited to this particular material, which is given as a preferred example. The arrangement will work with any permanent magnet material having a characteristic such that it can be forced to practically zero flux by an adverse field, and upon removal of the adverse field will regain practically full strength spontaneously. The oxide magnets of the type described are desirable for various reasons, including the feature of being commercially economic and having the characteristics desired.

I have, in the drawings and specification, presented a detailed disclosure of the preferred embodiments of my invention, and it is to be understood that I do not intend to limit the invention to the specific form disclosed, but intend to cover all modifications, changes and alternative constructions and methods falling within the scope of the principles taught by my invention.

I claim as my invention:

1. A mechanism for selectively holding or releasing a member comprising a permanently magnetized magnet element having a strong magnetic field, a keeper formed of magnetically attracted material and movably located with respect to the position of the magnet and normally attracted and maintained in a hold position close to the magnet, means for creating a strong adverse magnetic field in the field of the permanent magnet to substantially cancel the effective flux of the magnet, means for selectively operating said adverse field creating means whereby the permanent magnet will be selectively made ineffective or will recover its strength, and means for automatically moving the keeper away from the magnet to a release position when said adverse field is created to cancel the effective flux of the magnet, said release position located within the field of said magnet element and where the magnet element will move the keeper to said hold position.

2. A mechanism for selectively holding or releasing a member comprising a permanently magnetized magnet element having a strong magnetic field, a keeper formed of magnetically attracted material and movably located with respect to the position of the magnet and normally attracted and held in a position close to the magnet, means for creating a strong adverse magnetic field in the field of the permanent magnet to substantially cancel the effective flux of the magnet, means for selectively operating said adverse field creating means whereby the permanent magnet will be selectively made ineffective or will recover its strength, spring means continually biasing the keeper in a direction against the flux of said magnet and being less strong than the normal field of said magnet but being stronger than the field when affected by said adverse field whereby the keeper will be moved away from the magnet, and means for limiting the movement of the keeper away from the magnet element to a position where the magnet can pull the keeper to said position close to said magnet.

3. A mechanism for selectively holding or releasing a member comprising a permanently magnetized magnet element having a strong magnetic field, a barium oxide iron oxide magnet having a strong field, means for creating a strong adverse magnetic field in the field of the permanent magnet to substantially cancel the effective flux of the magnet, and means for selectively operating said adverse field creating means whereby the permanent magnet will be selectively made ineffective or will recover its strength.

4. A mechanism for selectively attracting or releasing magnetically attracted material comprising a permanently magnetized magnet element, a magnetically attracted keeper movably supported to move to a held position close to the magnet element or to a release position, said release position located where the magnet element will again draw the keeper to held position, an electrical coil positioned to generate a flux in a direction adverse to the field of the magnet whereby the magnet will not put out an effective flux, and an electrical circuit connected to the coil and being selectively operable to impress a voltage across the coil whereby an adverse field will be selectively generated by said coil or to break the circuit through the coil whereby the magnet will recover substantially full strength.

5. A mechanism for selectively attracting or releasing magnetically attracted material comprising a barium oxide iron oxide magnet having a strong field, an electrical coil positioned to generate a flux in a direction adverse to the field of the magnet whereby the magnet will not put out an effective flux, and an electrical circuit connected to the coil and being selectively operable to impress a voltage across the coil whereby an adverse field will be selectively generated by said coil or to break the circuit through the coil whereby the magnet will recover substantially full strength.

6. A mechanism for selectively holding or releasing a member comprising a permanently magnetized magnet element having a strong magnetic field, a keeper formed of magnetically attracted material and movably located with respect to the position of the magnet and normally attracted and held in a position close to the magnet, means for creating a strong adverse magnetic field in the field of the permanent magnet to substantially cancel the effective flux of the magnet, means for selectively operating said adverse field creating means whereby the permanent magnet will be selectively made ineffective or will recover its strength, spring means continually biasing the keeper in a direction against the flux of said magnet and being less strong than the normal field of said magnet but being stronger than the field when affected by said adverse field whereby the keeper will be moved away from the magnet, and means for limiting the relative movement of the keeper away from the magnet to a distance within the effective field of the magnet whereby the keeper will be drawn toward the magnet when unaffected by said adverse field.

7. A mechanism for selectively holding or releasing a magnetically attracted object comprising an annular magnet ring having a permanently magnetized characteristic, a spool including a circular end plate positioned on a first side of the magnet ring and connected to support the ring, and a spool center post secured to the axial center of the plate, an electric coil surrounding the spool post, a hollow cup having a bottom and an annular wall with the spool post secured to the inner bottom and the wall forming a housing surrounding the coil and the magnet ring and spaced from said ring, a circular keeper plate having a diameter larger than the magnet ring to rest against the edge of said cup wall when attracted by said magnet ring, a spring positioned between said plate and said keeper and urging the keeper in a direction away from said magnet, a control circuit electrically connected to the coil and operative to selectively impress a direction current on the coil to create a flux opposed to the field of the permanent magnet whereby the keeper will be attracted to the magnet when the coil is deenergized and will be forced away from the magnet by the spring when the coil is energized.

8. A mechanism in accordance with claim 7 wherein the magnet ring is formed of a barium oxide iron oxide material.

9. A mechanism for selectively and controllably attracting or releasing a magnetically attracted element comprising a first annular magnet ring having a permanent magnet having a characteristic to exert a field in a radial direction, a second annular magnet ring having a characteristic to exert a permanent magnetic field in a radial direction and spaced from said first ring, an electric coil having an annular shape and positioned between said first and second magnet rings, a sleeve surrounding and supporting said first and second magnetic rings and formed of a flux conducting material, said sleeve projecting axially beyond the first ring in a direction away from said second ring, a circular keeper plate positioned opposite the end of the sleeve and movable toward the first magnet ring when attracted by said magnetic rings, a keeper plate core extending axially through the magnet rings and secured to said keeper plate to move axially therewith, spring means urging said keeper plate away from the said first magnet ring, and an electrical circuit connected to said coil and selectively operable to supply a direct current thereto creating a flux in opposition to the flux of said permanent magnet rings where by the flux is effectively canceled and the spring moves the keeper plate away from the sleeve end.

10. A mechanism for selectively attracting or releasing a magnetically attractable article comprising first and second spaced annular magnet rings exhibiting permanent magnetic characteristics in a radial direction, a core of magnetically attractable material extending axially through said rings and having an enlarged keeper end movable toward or away from one of said rings, an electric coil annularly surrounding said movable core and wound to generate an electrical field adverse to the field of said magnetic rings when energized with a direct electrical current, means for moving the keeper plate away from the permanent magnet ring when said coil is energized, and means for impressing an electric voltage on said coil in a selective manner to control the position of said keeper.

11. A mechanism for selectively attracting or releasing a magnetically attractable article comprising first and second spaced annular magnet rings exhibiting permanent magnetic characteristics in a radial direction, a core of magnetically attractable material extending axially through said rings and having an enlarged keeper end movable toward or away from one of said rings, an electric coil annularly surrounding said movable core and wound to generate an electrical field adverse to the field of said magnetic rings when energized with a direct electrical current, a spring connected to the core for urging the keeper plate away from the magnet rings, a non-magnetic plate located between the coil and one of said rings with the spring connected to the plate, and means for impressing an electric voltage on said coil in a selective manner to control the position of said keeper.

12. A mechanism for selectively holding or releasing a magnetically attractable object comprising in combination an annular ring exhibiting a field of a permanent nature, an electric coil having annular windings located within said ring and having a hollow center, a core extending through said center and movable axially therein, a keeper plate attached to the end of said core and movable therewith, an annular plate positioned at each side of said magnetic ring, means urging the core and keeper plate in a direction away from said magnetic ring, and an electrical circuit connected to said coil and operative to selectively be energized and create a field adverse to the permanent field of said core whereby the flux is effectively canceled and the plate is permitted to be urged away from the ring.

13. A mechanism for selectively attracting or releasing magnetically attracted material comprising a permanently magnetized magnet element, a keeper member formed of a magnetically attracted material adapted to be drawn and maintained in a held position, means for creating a strong adverse magnetic field in the field of the permanent magnet to substantially cancel the effective flux of the magnet and permit movement of the keeper member to a release position, said release position being in the field of said magnet element and where the member will be drawn to said held position by the magnet element, means for selectively operating said adverse field creating means whereby the permanent magnet will be selectively made ineffective or will recover its strength, and means supporting said keeper member and accommodating movement between said held and said release position.

References Cited in the file of this patent
UNITED STATES PATENTS

| | | |
|---|---|---|
| 1,534,753 | Watson | Apr. 21, 1925 |
| 2,188,803 | Boehne | Jan. 30, 1940 |